United States Patent
Hur

(10) Patent No.: US 7,324,479 B2
(45) Date of Patent: Jan. 29, 2008

(54) CELL SEARCH METHOD IN UMTS

(75) Inventor: Seong-Ho Hur, Songnam-shi (KR)

(73) Assignee: Samsung Electronics Co., Ltd (KR)

( * ) Notice: Subject to any disclaimer, the term of this patent is extended or adjusted under 35 U.S.C. 154(b) by 1073 days.

(21) Appl. No.: 10/281,494

(22) Filed: Oct. 28, 2002

(65) Prior Publication Data

US 2003/0081571 A1    May 1, 2003

(30) Foreign Application Priority Data

Oct. 27, 2001    (KR) ............................. 2001-66590

(51) Int. Cl.
*H04Q 7/00* (2006.01)
(52) U.S. Cl. ...................... 370/332; 370/335
(58) Field of Classification Search ............ None
See application file for complete search history.

(56) References Cited

U.S. PATENT DOCUMENTS 6,526,039 B1 *   2/2003   Dahlman et al. ............ 370/350
6,744,747 B2 *   6/2004   Shiu et al. .................. 370/331
6,775,242 B2 *   8/2004   Grilli et al. ................. 370/252
2003/0036384 A1 * 2/2003  Chen et al. ................. 455/437

* cited by examiner

*Primary Examiner*—Brian Nguyen
(74) *Attorney, Agent, or Firm*—The Farrell Law Firm, PC

(57) ABSTRACT

A cell search method in an asynchronous mobile communication system. For cell search, a UE searches signals received from Node Bs in a slot synchronization step, calculates the timing offset of each of the Node Bs by comparing signals having slot peaks higher than a first threshold with each other among the searched signals in a frame synchronization and code group identification step, and detects the timing offsets of neighbor Node Bs by comparing the timing offsets of signals higher than a second threshold with each other in a code identification step. In addition, Node Bs that transmit signals higher than the second threshold in the code identification step are included in a candidate set and are subject to a cell search periodically.

4 Claims, 2 Drawing Sheets

CELL SEARCH METHOD IN UMTS

PRIORITY

This application claims priority to an application entitled "Cell Search Method in UMTS" filed in the Korean Industrial Property Office on Oct. 27, 2001 and assigned Ser. No. 2001-66590, the contents of which are herein incorporated by reference.

BACKGROUND OF THE INVENTION

1. Field of the Invention

The present invention relates generally to a mobile communication system, and in particular, to a method of locating a mobile terminal.

2. Description of the Related Art

The main feature of mobile communication systems is mobility. While existing wired communication systems are limited in mobility over a wired network, the mobility limitations are overcome over a wireless network in the mobile communication systems. The mobility is ensured by use of a mobile terminal. In a cellular mobile communication system, a mobile terminal detects a reference cell having the strongest pilot channel signal by continuously searching neighbor cells and demodulates a signal having the best quality among signals received in different paths from the reference cell. For path demodulation, the mobile terminal performs neighbor cell search continuously. The neighbor cell search is also needed at a handoff.

In an existing synchronous mobile communication system, the timing offsets of base stations are used in cell search. That is, all base stations synchronize their timings to a clock signal received from one GPS (Global Positioning System) at predetermined different time intervals. A mobile terminal detects the timing of a neighbor cell by comparing the timing offset of the neighbor cell received from a network and its current searcher timing. The mobile terminal updates cell search results by measuring the energy (reception power level) of the neighbor cell using the detected timing. If the measured energy is higher than that of a signal from its serving base station, the mobile terminal performs a handoff. The use of timing information about a neighbor cell facilitates a search for the neighbor cell by window cell search in the synchronous system.

Meanwhile, with asynchronous deployment, since Node Bs do not have unique timing offsets, the above cell search method is not valid in UMTS.

SUMMARY OF THE INVENTION

It is, therefore, an object of the present invention to provide a cell search method in an asynchronous mobile communication system in which there is no timing offset between Node Bs.

To achieve the above and other objects, a UE searches signals received from Node Bs in a slot synchronization step, calculates the timing offset of each of the Node Bs by comparing signals having slot peaks higher than a first threshold with each other among the searched signals in a frame synchronization and code group identification step, and detects the timing offsets of neighbor Node Bs by comparing the timing offsets of signals higher than a second threshold with each other in a code identification step. In addition, Node Bs that transmit signals higher than the second threshold in the code identification step are included in a candidate set and are subject to a cell search periodically.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
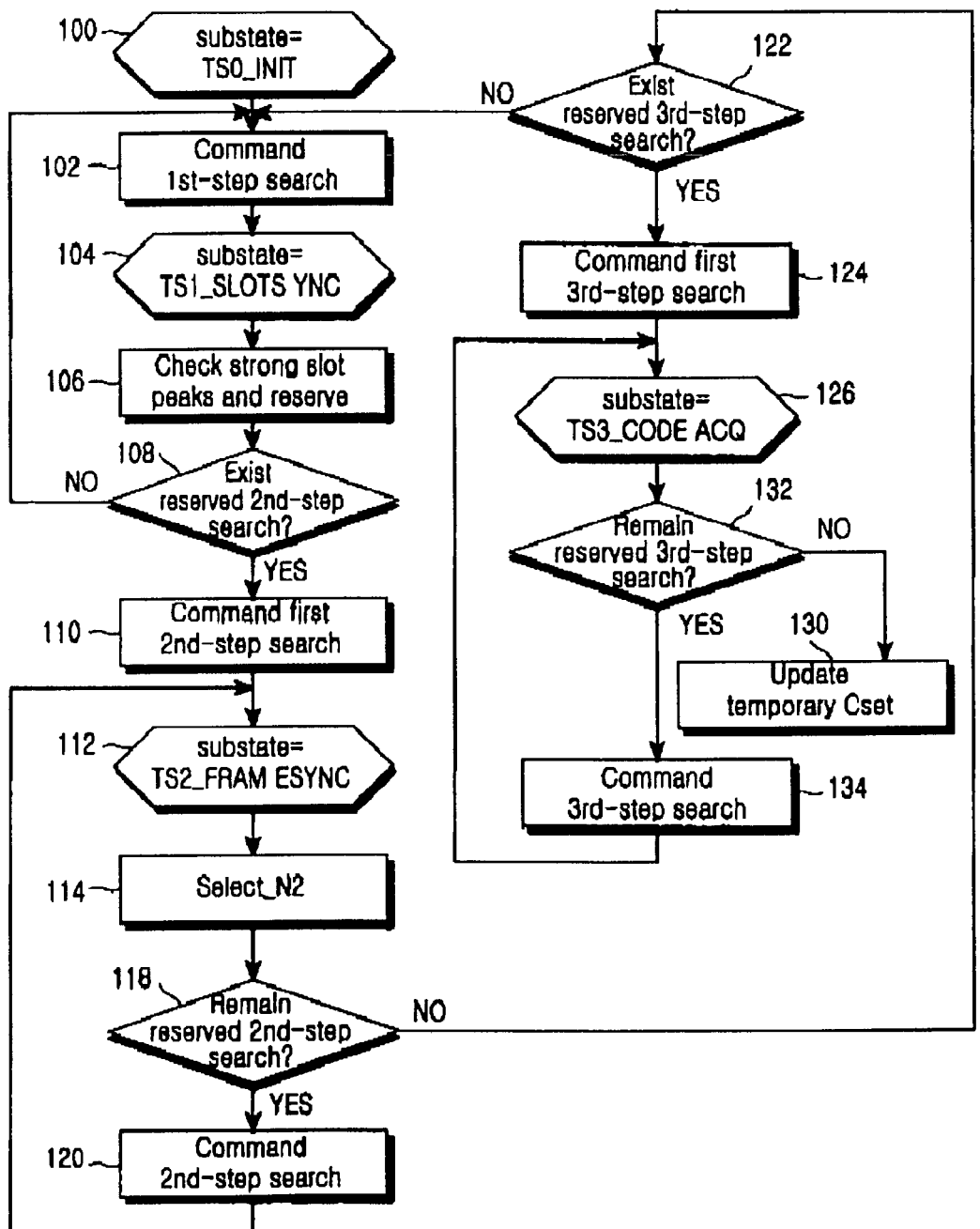
FIG. 1 is a flowchart illustrating a procedure for detecting the timing offsets and energy of neighbor cells of which the timing offsets are not known in a UE (User Equipment) according to an embodiment of the present invention.

A preferred embodiment of the present invention will be described herein below with reference to the accompanying drawings. In the following description, well-known functions or constructions are not described in detail since they would obscure the invention in unnecessary detail.

When a UE moves out of a Node B and enters the service area of another Node B, it detects the pilot PN offsets of neighbor Node Bs to determine access to the Node Bs. By the pilot PN offset detection, a handoff is implemented. However, the cell search for all Node Bs is impossible because there are hundreds or thousands of Node Bs. Therefore, the UE needs to know the PN offsets of neighbor cells around its serving Node B to efficiently acquire the pilot signals from the neighbor cells. The serving Node B transmits to the UE information about the PN offsets and frequencies of the neighbor cells. The serving Node B is a Node B of which the coverage area the UE is located in and which is connected to the UE for communication. The UE first acquires the pilot signals from the neighbor Node Bs included in the information transmitted by the serving Node B. The neighbor Node B PN offset information is called a neighbor list. This information is continuously updated each time power is on in the UE or the serving Node B is changed because of a handoff. The neighbor list is updated by receiving a new neighbor list at the UE from the serving Node B.

The serving Node B transmits a message containing the neighbor list via a paging channel or a communication channel. The UE receives a Neighbor List message from the serving Node B through a paging channel in an idle state, and receives a Neighbor List Update message from the serving Node B through a communication channel when the serving Node B is changed due to a handoff during a call. Thus the UE can manage the PN offset information of neighbor Node Bs by messages including the Neighbor List message or the Neighbor List Update message.

In CDMA (Code Division Multiple Access), reflected signals are considered not noise but the sum of received energy even in a multi-path fading environment where the amplitude of a received is changed due to the reflected signals as in cities. To efficiently detect and demodulate the reflected signals, an efficient signal detection method is required. For example, signals are detected within a few chips before and after the first arriving signal. This is called an active window search.

A receiver in the UE sets an active window with respect to the first arriving signal and searches reflected signals from multiple paths within the active window. While even a reflected signal from a far away place can be searched using a larger active window, a search time is prolonged and thus search efficiency is decreased. Therefore, a radio network must be designed so that the active window is made small in a city where a signal is reflected from buildings and there are small time differences between reflected signals, and made large in the suburbs where reflection occurs mainly from mountains.

In an embodiment of the present invention, cells around a UE are divided into an active set, a candidate set, a neighbor set, and a remaining set. The active set includes a Node B in current communication with the UE or Node Bs at a handoff. The candidate set includes Node Bs which are not communicating with the UE but have sufficient pilot strengths. The neighbor set includes neighbor Node Bs set in a Neighbor List message. The remaining set includes remaining Node Bs to which the UE is likely to be connected. Thus in general, an active set window is small for fast search, a remaining set window is large because a search of the remaining set is slow. After the UE searches the active set and the candidate set, it searches the neighbor set and the remaining set.

In an asynchronous mobile communication system to which the present invention is applied, there is no fixed timing offset between Node Bs and the network does not transmit timing offset information about a Node B to a UE, as compared to a synchronous mobile communication system. Instead, Node Bs are discriminated by 512 PN codes.

A cell search method according to the embodiment of the present invention includes a procedure for detecting the timing offsets and energy of neighbor cells (asynchronous cell search) and a procedure for searching the neighbor cells whose timing offsets are detected (cell search using an active window).

FIG. 1 is a flowchart illustrating a procedure for detecting the timing offsets and energy of neighbor cells whose timing offsets are not known in a UE according to the embodiment of the present invention.

A cell search in an asynchronous mobile communication system takes more time than in a synchronous mobile communication system because each cell uses a different scrambling code. Therefore, a three-step asynchronous searcher is used for the timing offset and energy detection, for fast cell search. The searcher performs the following three steps: (1) cells are grouped according to their scrambling codes and the slot timing of a Node B having the strongest power is detected using a PSCH (Primary Synchronization Channel); (2) frame timing is acquired using an SSCH (Secondary Synchronization Channel) and the code group of the Node B is detected among 64, code groups; and (3) the scrambling code of the Node B is identified by correlating each candidate scrambling code with a CPCH (Common Pilot Channel). The above procedure can be divided into initialization, slot timing acquisition, frame timing acquisition and code group identification, and code identification. In FIG. 1, hexagons denote the respective operations.

Referring to FIG. 1, hardware and software parameters are initialized for asynchronous cell search in step 100 and the first-step search is commanded in step 102. That is, search of the slot timings of signals from Node Bs in the neighbor set using the PSCH is commanded. In step 104, slot timings are detected. By the slot timing search, the UE can measure the slot peaks of signals from the neighbor set Node Bs. If the first-step search is completed, a predetermined number of, N1 slot peaks higher than a threshold are reserved in step 106. In step 108, the UE determines whether the second sell search step is required. If it is, the UE goes to step 110 and otherwise, it returns to step 102. The second-step search is commanded for one of the N1 Node Bs in step 110. In step 112, the frame timing and code group of the cell are detected and then it is determined whether the second cell search step is completed. The frame timing and code group search is performed for a selected cell using a corresponding slot timing obtained in the first cell search step. More specifically, the reception timings of the SSCHs can be detected after the PSCH is detected. Code groups having correlations higher than a threshold can be detected using the SSCHs. Then frame timings are acquired according to the code groups. If the second-step search is completed, a predetermined number of N2 frame timings and code groups higher than a threshold are reserved in step 114. In steps 118 to 120, the second-step search is performed on the remaining (N1−1) cells and N2 frame timings and code groups are detected with respect to each of the (N1−1) cells. In step 122, the UE determines whether to perform the third cell search step. If the third cell search step is to be performed, the UE goes to step 124 and otherwise, it returns to step 102. After the second-step search is completed for the N1 slot peaks, N1×N2 frame timings and code groups each are subject to the third-step search. In step 126, a plurality of scrambling codes in each code group are correlated using the CPCH and a predetermined number of, N3 scrambling codes higher than a threshold are reserved. The UE determines whether frame timings and code groups remain for the third-step cell search in step 132. If they do, the UE goes to step 134, and otherwise, it goes to step 130. The UE commands the third-step cell search for the remaining frame timings and code groups in step 134 and then moves to step 126. If the third-step cell search is completed for the (N1×N2) frame timings and code groups, (N1×N2×N3) scrambling codes are designated as candidate members. Timings corresponding to the (N1×N2×N3) codes are detected in the above procedure. Thus a window search can be performed using these codes. After the third cell search step is finished, the UE returns to step 102.

Figure 2:
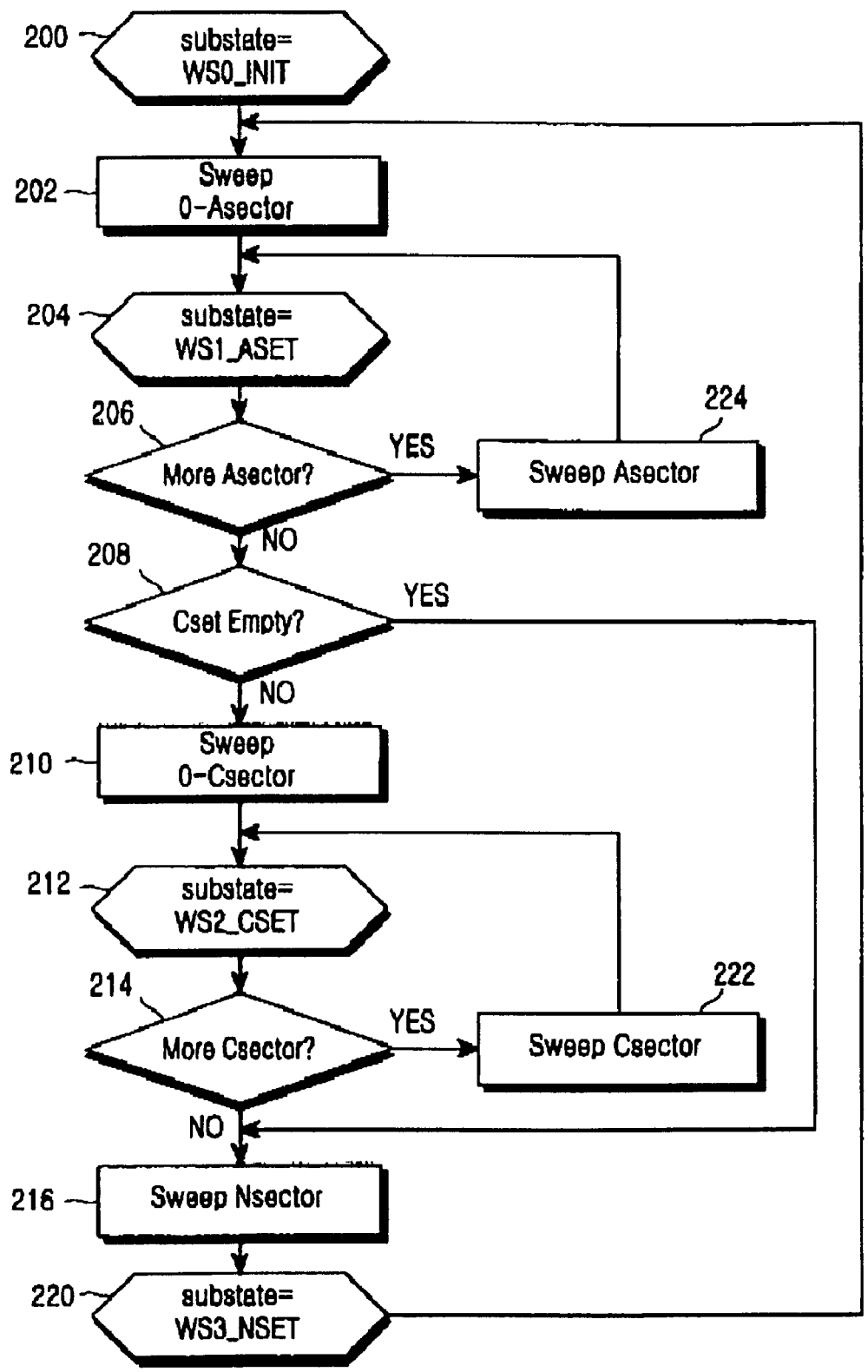
FIG. 2 is a flowchart illustrating a cell search procedure in an asynchronous mobile communication system according to the embodiment of the present invention.

FIG. 2 is a flowchart illustrating a cell search procedure for the candidate members in the asynchronous mobile communication system according to the embodiment of the present invention.

The candidate members are included in the candidate set and subject to a cell search. The cell search procedure is divided into initialization, active set search, candidate set search, and neighbor set search. The scrambling codes set in the procedure illustrated in FIG. 1 correspond to sectors in FIG. 2.

Referring to FIG. 2, the UE initializes hardware and software parameters for cell search in step 200 and selects one of active set sectors in step 202. In step 204, the UE performs a cell search on the selected sector and analyzes the search result. The UE determines whether active set sectors remain for the cell search in step 206. If they do, the UE goes to step 224 and if no active set sectors remain, it goes to step 208. The UE selects one of the remaining active set sectors in step 224 and returns to step 204. In the same manner, the active set sectors are searched.

In step 208, the UE determines whether candidate set sectors exist. The candidate members detected in the procedure of FIG. 1 are included in the active set. If they do, the UE goes to step 210 and otherwise, it goes to step 216. The UE selects one of the candidate set sectors in step 210 and searches the selected candidate set sector and analyzes the search result in step 212. In step 214, the UE determines whether other candidate set sectors remain. If they do, the UE goes to step 222 and otherwise, it goes to step 216. The UE selects one of the remaining candidate set sectors in step 222 and searches the selected candidate set sector. In the same manner, the candidate set sectors are searched.

The UE selects one of neighbor set sectors in step 216 and searches the selected neighbor set sector and analyzes the search result in step 220. Steps 216 and 220 are repeatedly performed for remaining neighbor set sectors. Then the UE analyses the cell search result for the neighbor set sectors and returns to step 202 after step 220.

In accordance with the present invention as described above, the UE includes sectors having timings higher than a threshold in a candidate set by an asynchronous cell search and periodically searches them. Therefore, optimum demodulation performance can be achieved and handoff can be actively performed.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of searching a plurality of neighbor cells that transmit signals using unique codes in a UE (User Equipment) that exchanges data with a reference cell in an asynchronous CDMA (Code Division Multiple Access) mobile communication system, the method comprising the steps of:

performing an asynchronous cell search on each of signals received from the neighbor cells and designating codes corresponding to the neighbor cells as a candidate sector group, from which the UE receives valid signals by the asynchronous cell search by obtaining N1 slot peaks higher than a first threshold among slot peaks measured using PSCH (Primary Synchronization Channel) signals from the neighbor cells, acquiring code groups and frame timings using SCCH (Secondary Synchronization Channel) signals received from the neighbor cells corresponding to the N1 slot peaks, and selecting N1×N2 code groups and frame timings higher than a second threshold, and selecting N3 correlations higher than a third threshold among correlations between a CPCH (Common Pilot Channel) signal received in correspondence with each of the N1×N2 code groups and frame timings and the codes of the N1×N2 code groups, and designating codes corresponding to N1×N2×N3 correlations as the candidate sector group; and measuring the power levels of signals with the codes designated as the candidate sector group by a window cell search.

2. The method of claim 1, further comprising the step of measuring the power level of a signal from at least one sector in a current active set of sectors by the window cell search before the asynchronous cell search of the candidate sector group.

3. A method of searching at least one neighbor cell in a UE (User Equipment) that exchanges data with a reference cell in an asynchronous CDMA (Code Division Multiple Access) mobile communication system, the method comprising the steps of:

performing an asynchronous cell search, comprising:

obtaining N1 slot peaks higher than a first threshold among slot peaks measured using a PSCH (Primary Synchronization Channel) signal from the neighbor cell;

acquiring code groups and frame timings for each of the N1 slot peaks using an SCCH (Secondary Synchronization Channel) signal from the neighbor cell, and selecting N2 code groups and frame timings higher than a second threshold; and selecting N3 correlations for each of N1×N2 code groups and frame timings, which is higher than a third threshold among correlations between a CPCH (Common Pilot Channel) signal received from the neighbor cell and the codes of the N1×N2 code groups, and designating codes corresponding to N1×N2×N3 correlations as a candidate sector group; and measuring the power levels of signals received from one of the sectors in the candidate sector group by a window cell search.

4. The method of claim 3, further comprising the step of measuring the power level of a signal from at least one sector in a current active set of sectors by the window cell search before the asynchronous cell search of the candidate sector group.

* * * * *